United States Patent
Green et al.

(10) Patent No.: US 8,570,169 B2
(45) Date of Patent: Oct. 29, 2013

(54) PORTABLE ASSET DISPENSING DEVICE

(75) Inventors: Michael Green, Delaware, OH (US); Kevin Hall, Westerville, OH (US)

(73) Assignee: Job Site Resources, LLC, Westerville, OH (US)

( * ) Notice: Subject to any disclaimer, the term of this patent is extended or adjusted under 35 U.S.C. 154(b) by 454 days.

(21) Appl. No.: 12/688,049

(22) Filed: Jan. 15, 2010

(65) Prior Publication Data

US 2011/0178630 A1    Jul. 21, 2011

(51) Int. Cl.
 *G08B 21/00*    (2006.01)
(52) U.S. Cl.
 USPC ........... 340/540; 340/602; 340/603; 340/612; 340/613; 340/666; 340/5.2; 340/5.7
(58) Field of Classification Search
 USPC .......................................................... 340/540
 See application file for complete search history.

(56) References Cited

U.S. PATENT DOCUMENTS

| | | | |
|---|---|---|---|
| 7,086,558 B1 | 8/2006 | Pixley et al. | |
| 7,317,393 B2 * | 1/2008 | Maloney | 340/568.1 |
| 7,337,963 B2 * | 3/2008 | Harper et al. | 235/385 |
| 7,371,977 B1 | 5/2008 | Preonas | |
| 7,946,644 B1 | 5/2011 | Foster | |
| 8,321,258 B2 * | 11/2012 | Gottlieb et al. | 705/7.26 |
| 2001/0035410 A1 * | 11/2001 | Taube et al. | 220/1.5 |
| 2002/0089434 A1 * | 7/2002 | Ghazarian | 340/988 |
| 2005/0093690 A1 * | 5/2005 | Miglionico | 340/539.1 |
| 2006/0103520 A1 * | 5/2006 | Clark | 340/506 |
| 2006/0107614 A1 * | 5/2006 | Slagel | 52/750 |
| 2006/0255934 A1 | 11/2006 | Easley et al. | |
| 2007/0108273 A1 | 5/2007 | Harper et al. | |
| 2007/0115127 A1 | 5/2007 | Harper et al. | |
| 2007/0228692 A1 | 10/2007 | Kern et al. | |
| 2008/0100416 A1 | 5/2008 | Harper et al. | |
| 2008/0164311 A1 | 7/2008 | Harper et al. | |
| 2008/0165013 A1 | 7/2008 | Harper et al. | |

OTHER PUBLICATIONS

Autocrib, Inc., AutoCrib Website Pages, http://www.autocrib.com/ Intelliport, Apr. 27, 2009, 6 pages.
Dropbox, Inc., DropBox Website Pages, http://www.dropboxinc.com, Apr. 27, 2009, 4 pages.
Dropbox, Inc., Drop Box Brochure from Website, http://www.dropboxinc.com, 2 pages.
Stanley Black & Decker, Inc., CribMaster Website Pages, http://www.cribmaster.com, Apr. 27, 2009, 3 pages.
U.S. Patent and Trademark Office; Office Action in U.S. Appl. No. 12/432,361 dated Nov. 30, 2011; 12 pages.

\* cited by examiner

*Primary Examiner* — George Bugg
*Assistant Examiner* — Anthony D Afrifa-Kyei
(74) *Attorney, Agent, or Firm* — Taft, Stettinius & Hollister, LLP; Stephen F. Rost, Esq.

(57) ABSTRACT

A portable dispensing device is provided having a container configured to be moved to a plurality of locations. An access point at an opening of the container controls access into and out of the container. A scale is coupled to a bin within the container and is configured to measure a weight of the bin and contents of the bin. A computing device is in electrical communication with the access point and the scale and configured to allow or deny access to the container as well as receive the measured weight from the scale to determine a number of items in the bin. The computing device further associates an item removed from the bin with the individual or credits an item returned to the bin with the individual when the individual exits the container.

20 Claims, 10 Drawing Sheets

PORTABLE ASSET DISPENSING DEVICE

FIELD OF THE INVENTION

The invention is generally related to monitoring and tracking objects and items, and more particularly, to systems, devices and methods for monitoring and tracking objects in a controlled space.

BACKGROUND OF THE INVENTION

Companies typically have difficulties tracking inventory items and their usage within their facilities. Many inventory items are misused, misplaced, and improperly tracked and replenished by the employees of the companies. Therefore, companies have incentives to track the items, hold employees responsible for missing items, properly account costs, and replenish the missing items based on demand. Typically items of the inventory are kept in a controlled space that is monitored. Some companies have used locking doors with keypads that allow only employees with authorized code to enter the controlled space. In addition, computers and bar code tags have been used to track the items in and out of the controlled space. However, these systems still lack tracking information, cost accounting information, security methods, and replenishment information in the process of tracking and monitoring the items stored in the controlled space and linking the responsible employee with the items being taken in and out of the controlled space.

Many industrial plants utilize one centralized location or facility to house their inventory of consumables, expendable items, indirect material, and maintenance, repair and operating ("MRO"). Typically, the average plant will include multiple facilities with multiple floors. This poses a multitude of challenges and inefficiencies. Significant loss in personnel productivity may be realized as a result of the following: extended line queue/bottlenecks at the central warehouse, extended trip time "to" and "from" the central warehouse, liability/risk associated when not providing safety items (personal protection equipment "PPE") in close proximity to work areas.

Many industrial plants operate with shifts around the clock and are open seven days a week, but do not have the resources to supervise their store/stock rooms on every shift. For example, second and third shift distribution and tracking of usage may be greatly reduced. Some plants shift the responsibilities to floor supervisors, which many times leads to open stock environments. Open stock environments, where inventory exists in an open or unsecured environment, lack accountability and traceability. Any semblance of inventory control and accountability is marginalized as a result of the lack of control during these non-peak hours. As such, over consuming, waste, and loss are common occurrences. Additionally, there is no process to track inventory levels or identify times for replenishment. Thus, purchasing the right items at the right time becomes a daunting task.

Lack of warehouse space is another common issue or challenge encountered by industrial plants. Some industrial plants compensate for limited storage or inventory space within their centralized store room and throughout the plant by constructing a satellite or secondary facility. However, many times this is not a viable option, even though the supplemental inventory is required throughout various areas of the plant.

In-plant suppliers and other vendors face additional challenges, which may include costs associated with remotely managing inventory located at plant and/or customer sites. These challenges include an inability to remotely monitor inventory levels of product at a customer site as well as a lack of automation tools to predict customer order replenishment. Contemporary processes for these vendors are generally entirely reactive. Documentation is typically manual and consists of redundant data entry. Additional inefficiencies and costs are associated with routinely sending representatives on-site to conduct physical counts of inventory. These onsite visits contribute to increased fuel costs, additional manpower requirements to conduct services, and loss of productivity (process is very time consuming). The inability to electronically track activity of consignment inventory may also produce increased administrative cost (invoicing, etc.) plus shipping, receiving, and carrying cost. Vendors may also experience limited security of consignment inventory as well as limited protection of inventory from potentially severe environmental conditions. Shelve or storage space at customer's site may also be limited.

The problem escalates when outside of a controlled environment such as a facility. Jobsite and yard equipment theft is significant with industry loss estimates up to one billion dollars annually, according to a 2003 National Equipment Register study. Tool tracking and management systems provide one level of security, but a large percentage of theft includes tools disappearing from jobsites or yards at the end of the workday. Some contemporary solutions to this problem include security portals designed for gate entrances and exits and activated by special electronic article surveillance ("EAS") security tags. Similar to retail environments, in practice, the portal sounds an alarm when an EAS tagged tool passes through it, alerting jobsite security and management to a problem. Portals are designed to attach to any fence or gate system for a secure entry and exit point. However, these solutions still lack the tracking and access control that is beneficial on a jobsite or in a yard with combinations of employees and contractors, as well as ease and portability of the secured area.

Additionally, many of the same challenges encountered by the plant internally are comparable to that of contractor, vendor, and rental suppliers. Limited resources, manual control procedures and documentation, limited space and locations all contribute to inventory shrinkage, lost productivity, potential safety issues and project delays. Many consumable and tool suppliers do not have the proper on-site storage facilities available to manage their inventory. Instead, they provide minimal security to their temporary supply depots, which leads to inaccuracies in accounting for job costing.

Therefore there is a need in the art for a system, apparatus and method that monitors and tracks items stored in a controlled space, which is conveniently portable throughout an industrial plant or outdoor location.

SUMMARY OF THE INVENTION

Embodiments of the invention provide a portable dispensing device in a container configured to be moved to a plurality of locations. The container includes an access point configured to control access into and out of the container. A bin within the interior of the container is coupled to a scale, which is configured to measure a weight of the bin and any contents of the bin. At least one item may be contained within the bin. The item is available to be removed from the bin and the container through the access point by an authorized individual. A computing device is in electrical communication with the access point and is configured to allow or deny access to the container. The computing device is in further electrical communication with the scale and is further configured to receive the measured weight from the scale and determine a number of items in the bin based on the measured unit weight. The computing device then associates the item removed from the bin with the authorized individual upon the individual exiting the container.

In some embodiments, the container is a standard 53 foot semi-trailer. In other embodiments, the container may be a standard container such as an eight foot standard container box, a ten foot standard container box, a 20 foot standard container box, or a standard 40 foot container box. In a specific embodiment, the container includes a side access door positioned to allow access into and out of the controlled space and a second container including a side access door, which, when the second container is positioned proximate the first container, the side access doors are essentially aligned, allowing authorized users access to the second container through the first and second side access doors.

Some embodiments include an HVAC system which is operable to control an environment on the inside of the container. Some embodiments of the portable dispensing device include a locking door at the access point with an electromagnetic lock coupled to the locking door. The computing device is configured to control a release of the electromagnetic lock in response to the input from the individual when the individual is authorized to enter the container. The portable dispensing device may also include an emergency door release, where the emergency door release is configured to release the electromagnetic lock allowing access to the interior of the container as well as configured to sound an alarm. Some embodiments of the portable dispensing device include an antenna. The antenna may be positioned on an outer surface of the container and configured to provide wireless internet access to the computing device within the container. Additionally some embodiments of the portable dispensing device may include a camera system. The camera system may include at least one camera device that is configured to take a digital picture of the authorized individual upon entering or exiting the access point. The camera device may be mounted within the interior of the container.

Embodiments of the portable dispensing device may also be equipped with presence sensing mats, which are configured to detect a presence of the authorized individual within the interior of the container. Shelving units, may be placed in the container and the scales may be coupled to the shelving units to prevent removal of the scales from the interior of the container.

Items may be removed from the portable dispensing device by entering a controlled access area of a container storing a plurality of items in a plurality of bins and configured to be moved to a plurality of locations. User access information may be entered at the controlled access area and in response to access being granted to a user, the user may enter the interior. Once inside the container, the user may retrieve at least one item of the plurality of items from at least one bin of the plurality of bins. Upon exiting the interior of the container through the controlled access area with the at least one item, the portable dispensing device automatically measures a weight of each of the plurality of bins and determines a number of items in each of the plurality of bins from the measured weight. The item removed is determined from a decrease in number of items in a bin of the plurality of bins and that item is then associated with the user.

In some embodiments, if the user is denied access, access to the interior of the container is prevented and the denied access may be logged. Additionally, in some embodiments, a picture of the user after being denied access may be captured. Alternatively, in some embodiments, a picture of the user entering the controlled access area may also be captured after being granted access. In some embodiments, after unlocking the door on the controlled access area to allow access to the interior of the container an alarm may sound in response to the door being held open longer than a set period of time.

Items may also be returned to the portable dispensing device by entering a controlled access area of a container which is configured to be moved to a plurality of locations and stores a plurality of items in a plurality of bins. User access information may be entered at the controlled access area and in response to access being granted to a user, the user may enter the interior of the container through the controlled access area to return at least one item of the plurality of items to the appropriate bin. Upon exiting the interior of the container through the controlled access area, the portable dispensing device automatically measures a weight of each of the plurality of bins and determines a number of items in each of the plurality of bins from the measured weight. Finally, the portable dispensing device determines the item from an increase in number of items in a bin of the plurality of bins and credits the item to the user.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the invention.

Figure 1:
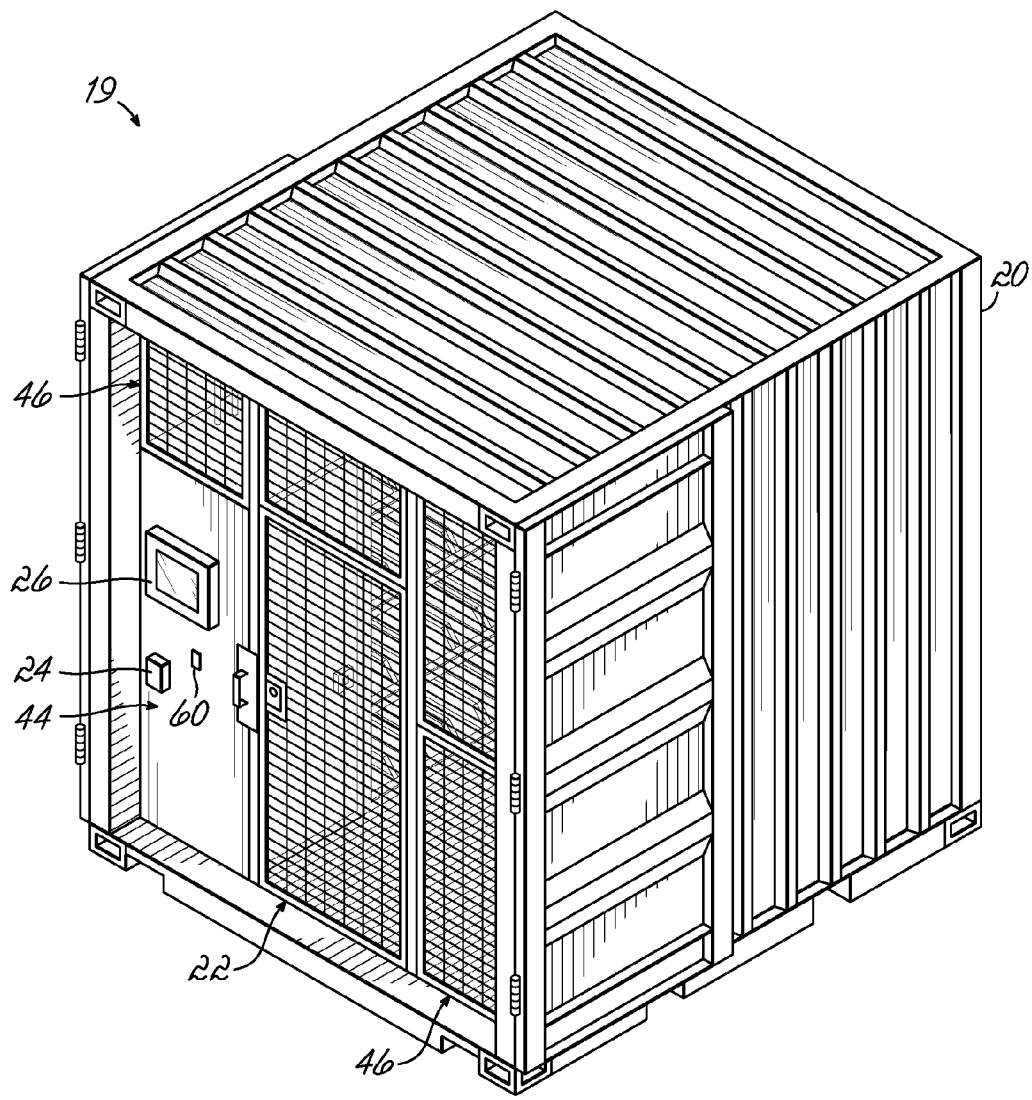
FIG. 1 is a perspective view of an exemplary dispensing unit consistent with embodiments of the invention.

It should be understood that the appended drawings are not necessarily to scale, presenting a somewhat simplified representation of various features illustrative of the basic principles of the invention. The specific design features of the sequence of operations as disclosed herein, including, for example, specific dimensions, orientations, locations, and shapes of various illustrated components, will be determined in part by the particular intended application and use environment. Certain features of the illustrated embodiments have been enlarged or distorted relative to others to facilitate visualization and clear understanding. In particular, thin features may be thickened, for example, for clarity or illustration.

DETAILED DESCRIPTION OF THE INVENTION

Embodiments of the invention address the deficiencies in the art by providing an industrial grade, mobile, secured point of use walk-in electronic dispensing device that delivers automated inventory control. Embodiments of the invention differ from contemporary point of use/vending devices in many respects. Many contemporary vending devices offer lower item capacity based on footprint and design of unit in comparison to embodiments of the invention. Embodiments provide flexibility in size of footprint as well as flexible shelving and bin configurations to maximize item volume. Helix type machine technologies, similar to a candy machine or other pie carousel devices are generally very restrictive in the type and quantity of items dispensed. Many of these devices are designed to only house small items. Embodiments of the invention, however, may be configured to hold various items from small consumables to small tools, such as electric tools.

Most vending devices are designed for indoor use only. Embodiments of the invention may be configured to operate in all environments. Contemporary helix, pie carousel, vertical and horizontal carousels have numerous moving parts that require maintenance. Embodiments of the invention utilize industrial grade scales that may be easily replaced without disruption of use to the unit. Restocking vending devices may be very time consuming. Processes may include entering each and every item that you wish to restock into the software and then waiting for the device to select the appropriate tray within the unit. With embodiments of the invention, an ID may be entered to gain entry in to the unit, inventory is placed into the correct bins and upon completion, when exiting, the inventory levels are adjusted to reflect affected bins.

Issue operations for contemporary dispensing units may be cumbersome. Many times the issue process includes scrolling through a long item list or typing in the description of the desired item. The process may be time consuming and confusing. Embodiments of the invention provide a more simplistic process including steps such as scanning a FOB or an ID card to gain entry to the unit, entering the unit to retrieve the needed items from bins and then exiting. After the individual leaves and the door closes, the bin weights are adjusted and the usage is updated in the system to reflect appropriate transaction.

Embodiments of the invention may also be configured with a variety of security and safety peripherals such as video surveillance system, motion sensor, emergency door release system with audible alarms. The emergency door release assists in preventing an individual from being trapped in device if they were to become incapacitated. Embodiments may utilize multiple access control options such as proximity card, LF, HF, UHF readers, bar code, or biometrics. Door sensors may include door tamper switches with audible alarms.

Turning now to FIG. 1, which illustrates an embodiment of the dispensing unit 19 implemented in a standard container 20. Containers may be of various sizes providing footprints to meet the needs of the location. For example, using bins that are 8.25" W×18" L×9" D, a standard eight foot container may support up to 56 bins. A standard ten foot container may support up to 64 bins and a standard twenty foot container may support up to 128 bins. The quantity of bins detailed for each container is not a maximum capacity, but rather one exemplary configuration. Additional shelves may be added to the shelving units in order to increase number of bins. Likewise, the number of bins may also be decreased in some embodiments. Access to the bins and items stored in the bins is controlled by access door 22. Door 22 is locked by use of a magnetic lock, for example, and allows access only to authorized personnel. In order to identify themselves, an employee or authorized contractor may swipe an employee ID card with a bar code or RFID or a key FOB that identifies the employee or contractor to the system. If the unit is currently unoccupied, the system releases the magnetic lock, allowing the door 22 to open and allowing the employee or contractor access to the unit. Additionally, the employee or authorized contractor may interact with the system via a touch screen interface 26. Access control, which allows only one individual at a time in the unit, assists in providing accurate usage records.

Figure 2A:
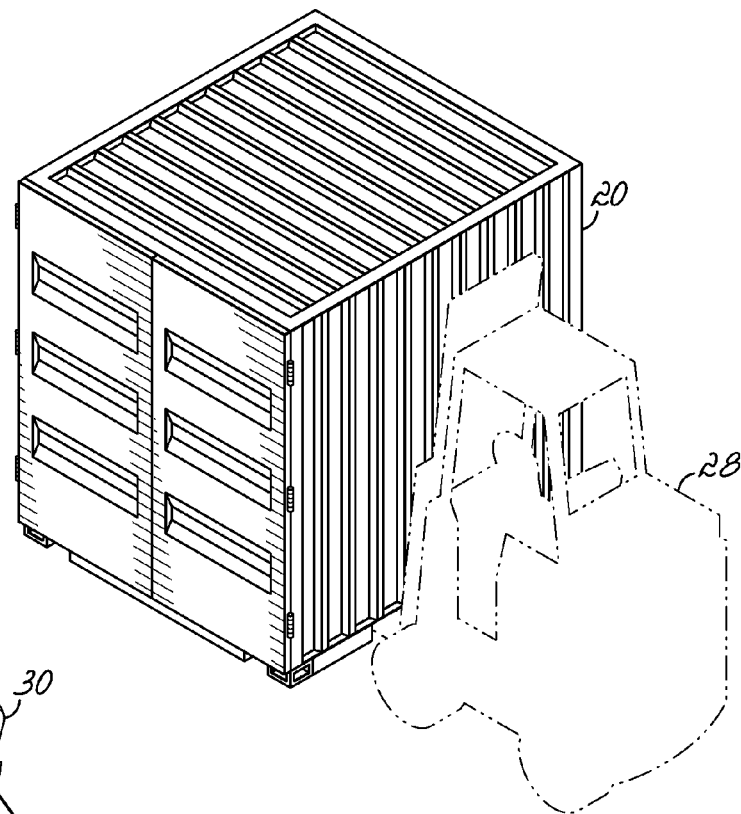
FIGS. 2A and 2B illustrate methods of moving the dispensing unit of FIG. 1 to alternate locations.
Figure 2B:
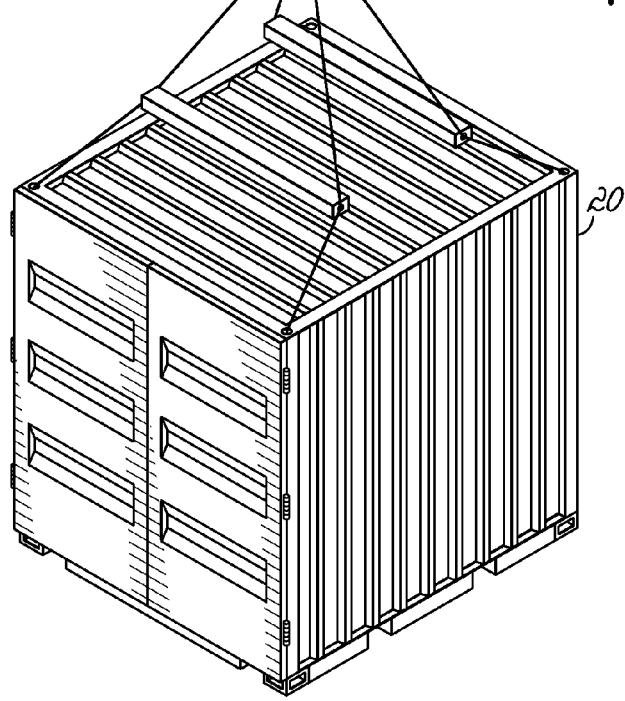
Figure 3:
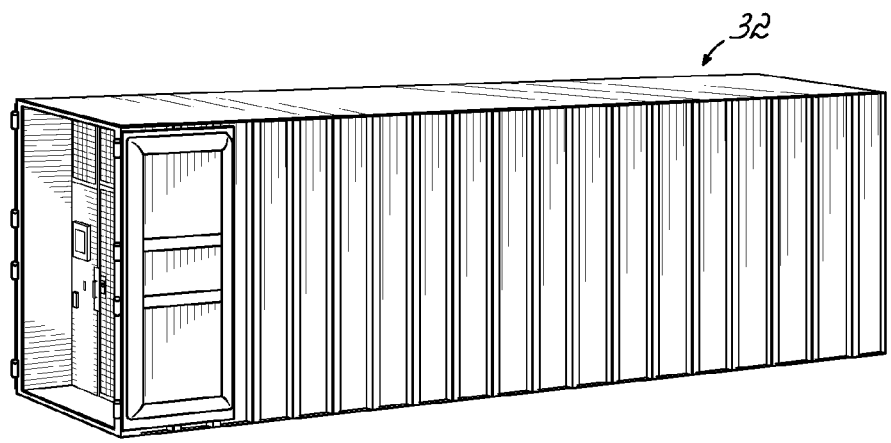
FIG. 3 is a perspective view of an alternate enclosure for the dispensing unit of FIG. 1.
Figure 4:
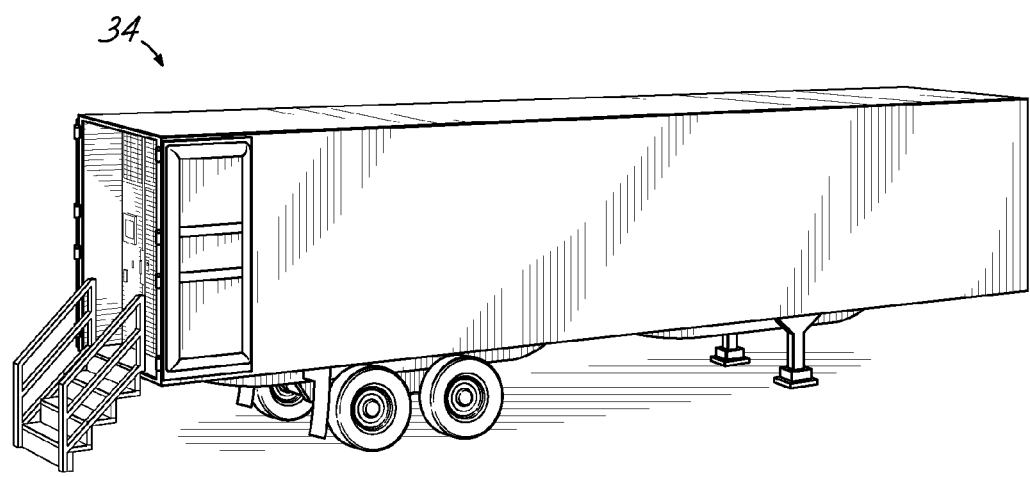
FIG. 4 is a perspective view of an alternate enclosure for the dispensing unit of FIG. 1.
Figure 5:
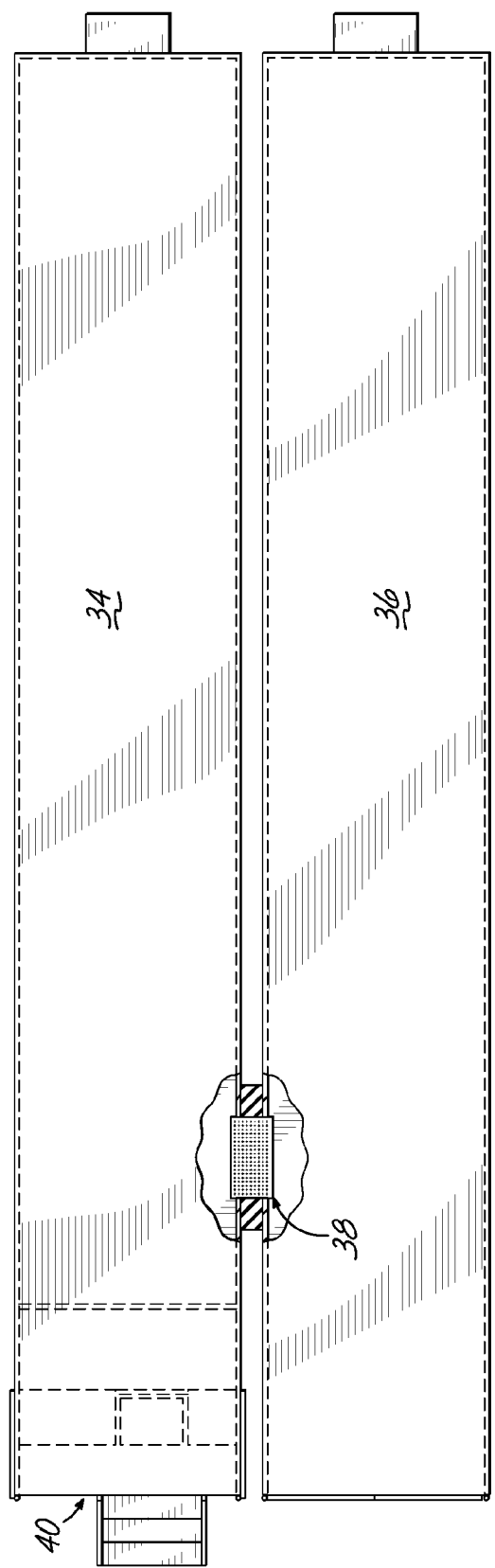
FIG. 5 is a top view of multiple containers being used for the dispensing unit of FIG. 1.

As can be seen in FIGS. 2A and 2B, the container 20 may be moved within the industrial facility via forklift 28 or overhead crane 30. In some embodiments, the container 20 may be transferred from a location within the facility to a location outside the facility where the contents of the container 20 may be needed. Embodiments of the invention for use outside of a facility or on a job site may require larger containers, such as a 40 foot container 32 as seen in FIG. 3, where larger items or tools may be stored. Alternatively, as seen in FIG. 4, containers for embodiments of the invention may be implemented in a standard semi-trailer 34, such as a standard 53 foot trailer, though other sized trailers may also be used depending on the space requirements needed for the controlled access. Smaller controlled spaces may be implemented in trailers of lengths 18-48 feet, while other spaces may require spaces exceeding a standard 53 foot trailer. In these latter instances and as seen in FIG. 5, multiple containers, such as trailers 34, 36, or other container types may be parked or placed next to one another, with an access 38 between the trailers as seen in FIG. 5. Here the first trailer 34 provides the controlled access point 40 and part of the controlled area, while the second trailer 36 provides additional space and is accessible only through the first trailer 34 via access point 38. If necessary, additional trailers or containers may also be used.

Regardless of the container used and referring again to FIG. 1, each of the containers includes a single controlled access point. As stated above, in order to provide accurate usage records, embodiments are designed to prevent multiple users in the unit at the same time. In some embodiments, a second access door may be implemented just inside of the container. The double access door may assist in ensuring that only one person may enter the unit at a time. Access to the container 20 is granted by software executing on computing device 42 (FIG. 6), which is in communication with the card reader 60, touch screen interface 26, and magnetic lock (not shown). When the individual is granted access, the software executing on computing device 42 denies access to other individuals until the individual granted access exits the container 20.

Figure 6:
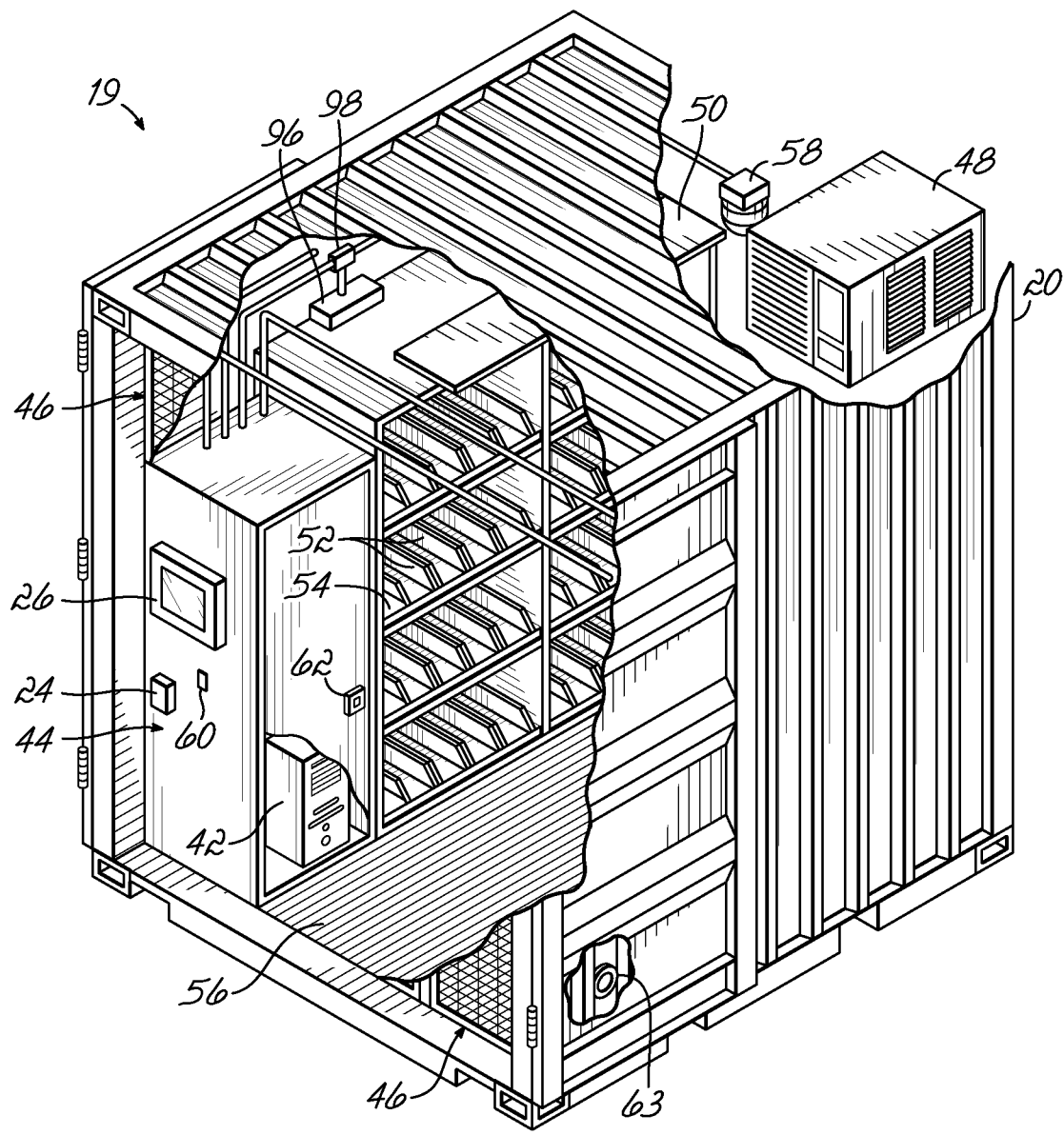
FIG. 6 is a partial cut-away view of the dispending unit in FIG. 1 showing a portion of the internal structure and content.

In some embodiments, the touch screen 26 and card reader 24 may be mounted on an exposed side of a cabinet 44, which is primarily enclosed within the container 20. As seen in FIG. 6, the computing device 42 may be located in the cabinet, which may be locked in some embodiments to prevent tampering with the computing device 42 or software installed thereon. The door 22 (shown in FIG. 1) and remaining surrounding structure 46 forming the access point may be composed of screen or grating material to facilitate viewing the inside of the container, which allows for a visual verification of another individual in the container. In other embodiments, the screen or grating of the door 22 and surrounding structure 46 may be implanted between sheets of unbreakable glass, such as LEXAN®, or the material may be solid material, preventing any viewing inside the container.

Embodiments of the invention may be climate controlled by use of an HVAC system 48 mounted on the container 20. The HVAC system 48 may be capable of heating or cooling the interior of the container as appropriate for the surrounding environmental conditions. Light fixture 50 provides light to the interior of the container. Depending on the size of the container 20, multiple light fixtures 50 may be employed to provide adequate lighting for the container. For example, an eight foot container may only require a single light fixture 50 where as a 20 foot or 40 foot container may require multiple light fixtures 50.

Bins 52 holding the inventory are positioned on shelves 54 mounted along the walls of the container 20. The number of shelves 54 and number of bins 52 on the shelves 54 are determined by the size of the container, with larger containers capable of including more shelves 54 and bins 52. Presence sensing mats 56 may be located between the shelves 54, along the floor of container 20. The mats 56 may be utilized to detect the presence of an individual within the container and also initiate scale weight scanning operations. Once an individual steps on the mat 56, the software executing on the computing device 42 may be triggered to prepare for the scanning of the scales 64. However, scanning will not occur until there is no longer weight on the mat 56 and the door 22 is completely closed, triggering the mechanical magnetic contact switch and the scanning process is initiated. Weight on the mats 56 may also send an operation to the software executing on the computing device 42 to lock down the electro-magnetic locking mechanism prohibiting any other individuals from access. Proximity reader 60 and interface controls, such as touch screen interface 26, may be disabled to prevent the entry of additional individuals while occupied.

The first point of security for the container 20 is the secure point of entry which may utilize a proximity reader 60 (RF LF, HF, or UHF), an ID with a magnetic swipe, bar code, biometrics, or access to the container via the touch screen interface 26 with a user ID and pin number. After gaining access, further security may be provided by a video surveillance camera 58 producing still images or streaming video. The container 20 may also be equipped with an alarm system. An audible alarm may be activated when a tamper switch (not shown) mounted on the door 22 remains disengaged for a period of time exceeding the time interval threshold set for the door 22 to be open. Once activated, an electronic notification may be sent to the authorities defined by the system administrator.

Additionally, in case of an emergency, an emergency unlock button 24 may be installed on the exterior of the cabinet 44 in case an individual becomes trapped or incapacitated within the container. The emergency button 24 may need to be pushed if an individual is in the container and unable to reach the exit button 62. When the button is pushed, in one embodiment, an audible alarm will sound and power to the electromagnetic lock will be cut disengaging the door. In embodiments that do not utilize electromagnetic locks, based on the wiring in the container, the unit may also be unplugged at the power supply connection 63, cutting power to the lock, if a twist type lock plug is being used.

Figure 7A:
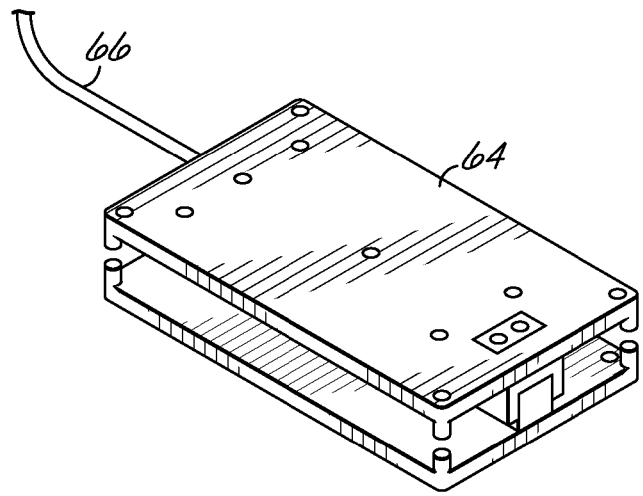
FIGS. 7A and 7B illustrate an electronic scale in use with a bin for holding items in the dispending unit of FIG. 1.
Figure 7B:
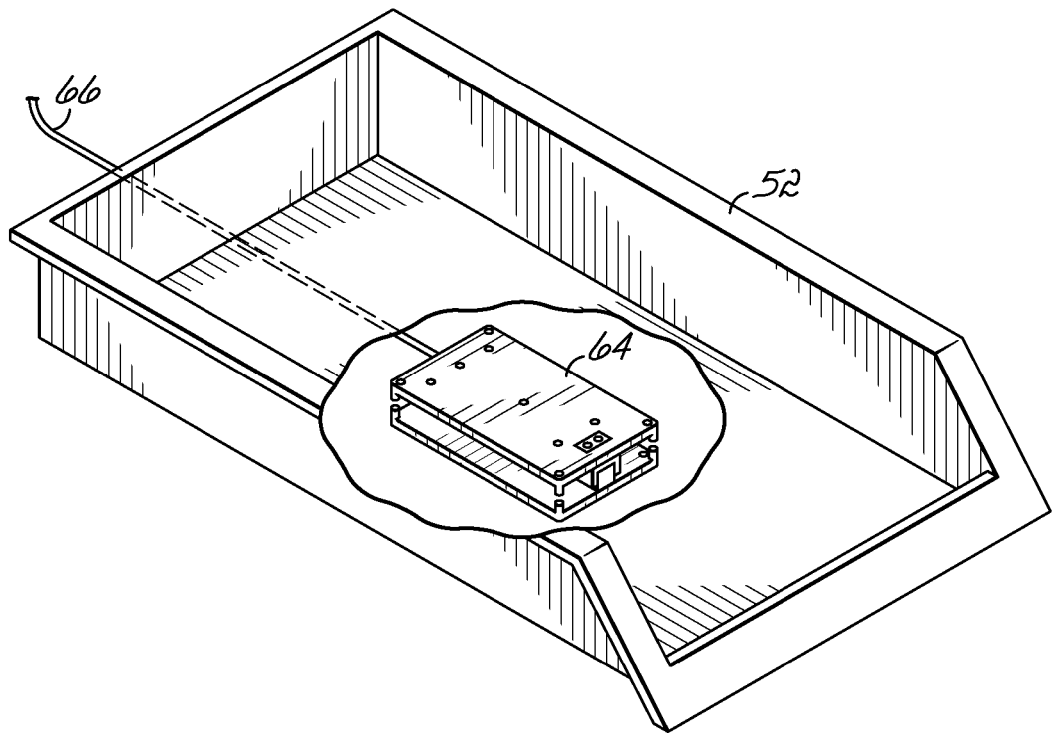

When an individual exits the container, scales 64 (FIGS. 7A and 7B) record the weight of the bins 52. Weight capacities of the scales 64 may range from approximately 25 lb capacity to upwards of approximately 1,000 lb capacity. The scale 64 dimensions may vary based upon weight capacity and application. As seen in FIG. 7B, the finished product assembly in some embodiments consists of a bin 52 fastened to a scale 64 and the scale 64 fastened to a shelf 54 (FIG. 6). The scales 64 communicate with the computing device 42 via cables 66. The scale 64 records the weight of the bin 52 and communicates that weight to software executing on the computing device 42. The software knows which items are contained in the bin and the nominal weight of each item. The software may divide the weight of the bin 52 by the nominal weight of the item in the bin 52 to determine the number of items in the bin 52. If the number of items in the bin 52 decreases, those item(s) are associated with the individual that was in the container. Likewise, if the number of items in the bin 52 increases, those item(s) are credited to the individual that was in the container.

Figure 8:
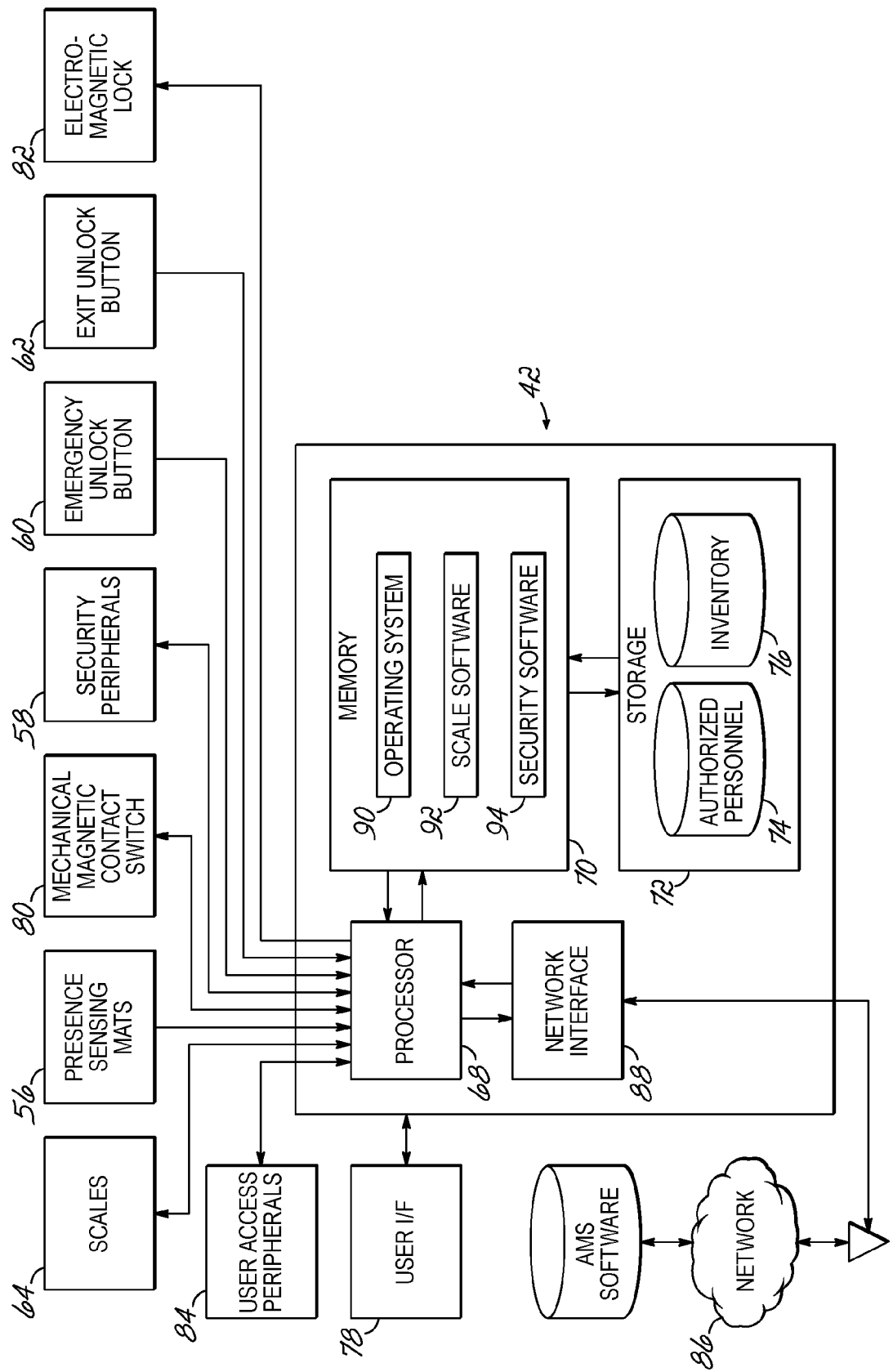
FIG. 8 is a block diagram of the hardware and software environment associated with the operation of the dispensing unit in FIG. 1

Computing device 42, as seen in more detail in FIG. 8, typically includes at least one processor 68 coupled to a memory 70. Processor 68 may represent one or more processors (e.g. microprocessors), and memory 70 may represent random access memory (RAM) devices comprising the main storage of computing device 42, as well as any supplemental levels of memory, e.g., cache memories, non-volatile or backup memories (e.g. programmable or flash memories), read-only memories, etc. In addition, memory 70 may be considered to include memory storage physically located elsewhere in computing device 42, e.g., any cache memory in a processor 68, as well as any storage capacity used as a virtual memory, e.g., as stored on a mass storage device 72. The mass storage device 72 may contain one or more databases with information related to personnel with authorized access 74 to the controlled area as well as inventory 76 both in the controlled area and assigned to authorized personnel.

Computing device 42 also typically receives a number of inputs and outputs for communicating information externally. For interface with a user or operator, computing device 42 typically includes one or more user interface devices 78, such as input devices (e.g., a keyboard, a mouse, a trackball, a joystick, a touchpad, a keypad, a stylus, a microphone, a card reader, a magnetic scanner, and/or a bar code reader, among others). Interface devices 78 may also include a display or other output device (e.g., a CRT monitor, an LCD display panel, and/or a speaker, among others). Additional inputs and outputs may also include scales 64, presence sensing mats 56, mechanical magnetic contact switch 80, security peripherals 58, the emergency unlock button 60, the exit unlock button 62, electromagnetic lock 82, and any other user access peripherals 84. Computing device 42 may also communicate on a network 86, either wired or wireless, through a network interface 88. In some embodiments, network interface 88 may connect through a Digi ConnectPort WAN 3G Router, which provides remote, secure wireless connectivity to the Internet. In other embodiments, other high speed cellular or wired connections may be used to connect to the internet. Some embodiments may employ a virtual private network (VPN) to connect the computing device 42 of the dispensing unit to an internal network for remote administration. If the dispensing unit is located outdoors, some embodiments may employ an 8 dBi 24 inch Omni-Directional Antenna, which may be mounted on the exterior of the cabinet 44 or on an exterior side of the container 20. The antenna may assist in improving wireless signal quality and strength when a wireless network is available. The Antenna may extend a wireless connection up to approximately 2,000 ft.

Computing device 42 operates under the control of an operating system 90, and executes or otherwise relies upon various computer software applications, components, programs, objects, modules, data structures, etc. (e.g. scale software 92 and/or security software 94). Under control of the operating system 90 and security software 94, the processor 68 may allow/deny access to the controlled space by engaging or disengaging the electro-magnetic lock 82, detect the presence of an employee or contractor on a presence sensing mat 56, read identification data from either an identification card, key fob, or interact with the user interface 78. The processor under further control of the operating system 90 and scale software 92 may receive weights from each of the scales and calculate the inventory in each of the bins associated with the scales in order to assign or credit inventory with the individual identified by the security software 94.

In general, the routines executed to implement the embodiments of the invention, whether implemented as part of an operating system or a specific application, component, program, object, module or sequence of instructions will be referred to herein as "computer program code", or simply "program code". The computer program code typically comprises one or more instructions that are resident at various times in various memory and storage devices in a computer, and that, when read and executed by one or more processors in a computer, causes that computer to perform the steps necessary to execute steps or elements embodying the various aspects of the invention. Moreover, while the invention has and hereinafter will be described in the context of fully functioning computers and computer systems, those skilled in the art will appreciate that the various embodiments of the invention are capable of being distributed as a program product in a variety of forms, and that the invention applies equally regardless of the particular type of computer readable media used to actually carry out the distribution. Examples of computer readable media include but are not limited to physical, recordable type media such as volatile and non-volatile memory devices, floppy and other removable disks, hard disk drives, optical disks (e.g., CD-ROM's, DVD's, etc.), among others, and transmission type media such as digital and analog communication links.

In addition, various program code described hereinafter may be identified based upon the application or software component within which it is implemented in specific embodiments of the invention. However, it should be appreciated that any particular program nomenclature that follows is merely for convenience, and thus the invention should not be limited to use solely in any specific application identified and/or implied by such nomenclature. Furthermore, given the typically endless number of manners in which computer programs may be organized into routines, procedures, methods, modules, objects, and the like, as well as the various manners in which program functionality may be allocated among various software layers that are resident within a typical computer (e.g., operating systems, libraries, APIs, applications, applets, etc.), it should be appreciated that the invention is not limited to the specific organization and allocation of program functionality described herein.

Those skilled in the art will recognize that the exemplary environment illustrated in FIG. 8 is not intended to limit the present invention. Indeed, those skilled in the art will recognize that other alternative hardware and/or software environments may be used without departing from the scope of the invention. Those skilled in the art will also appreciate that the physical requirements of the computing environment may require additional structural support and vibration tolerance due the mounting of the computing device 42 in a container 20, 32 as in FIGS. 1 and 3 or trailer 34 as in FIG. 4. The mobility of the dispensing unit may introduce additional shock and vibration type loads not foreseen or experienced by similar non-mobile configurations.

Figure 9:
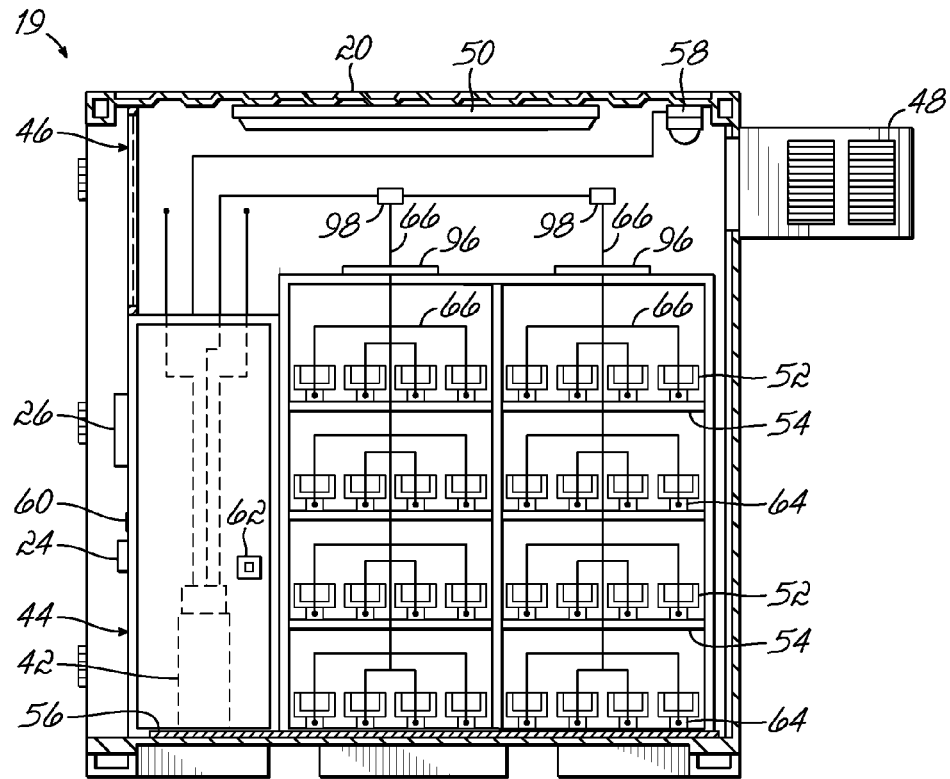
FIG. 9 is a side view of the dispensing unit of FIG. 1, illustrating wire connections to a central cabinet.
Figure 10:
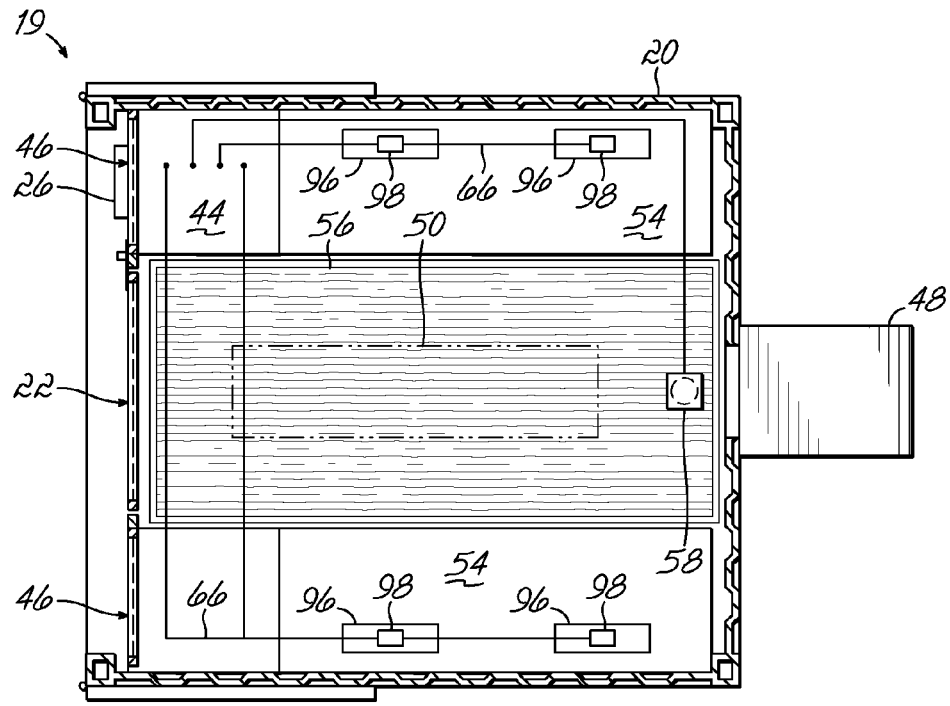
FIG. 10 is a top view of the dispensing unit of FIG. 1, illustrating wire connections to a central cabinet.

As seen in FIGS. 9 and 10, wires 66 from scales 64 collect at hubs 96, 98 and are routed to the cabinet 44 containing computing device 42. Additionally, inputs from the security camera 58 and sensing mat(s) 56 may also be routed to the cabinet 44 containing computing device 42.

Figure 11:
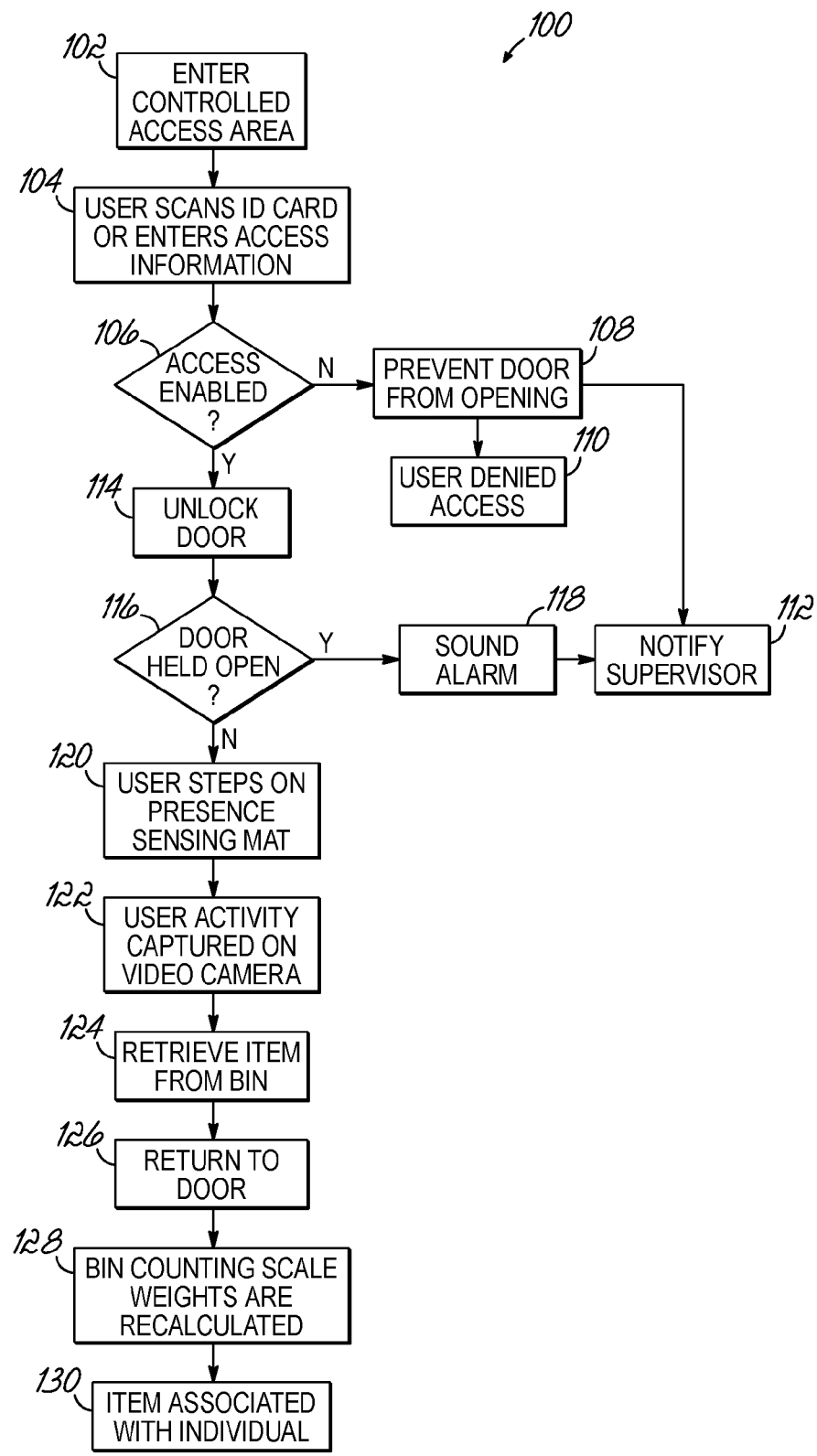
FIG. 11 is a flow chart illustrating the sequence of steps when retrieving an item from the dispensing unit.

In operation, the security 94 and scale 92 software work in conjunction to monitor the inventory in the dispensing unit 19. Flowchart 100 in FIG. 11, illustrates steps performed when retrieving an item from the dispensing unit 19. A user, such as an employee or contractor, enters the controlled access area of the dispensing unit (block 102). The user scans an ID card or FOB, or alternatively enters access identification information on the touch screen (block 104). The security software may then determine from the identification information if access should be granted to the user. If access is not granted ("No" branch of decision block 106), then the door is prevented from being opened (block 108) denying access to the user (block 110). In some embodiments, a supervisor or other administrator is notified of the denied access (block 112).

If the security software determines that the user is authorized and access is granted ("Yes" branch of decision block 106), the magnetic lock in some embodiments may be disengaged unlocking the door (block 114). In embodiments that do not utilize magnetic locks, other appropriate signals may be sent to the locking mechanism to unlock the door and allow access. If the door is held open longer than a predetermined period of time ("Yes" branch of decision block 116), then an alarm is sounded (block 118) and a supervisor or other administrator may be notified (block 112). The alarm and notification may assist in discouraging an individual from circumventing the access control and tracking of items within the dispensing unit.

Under normal operation ("No" branch of decision block 116), the user steps on to the presence sensing mat (block 120), and the door closes behind them. The presence sensing mats detect the presence of the user in the distribution unit and the user's activity may be captured as snap shot images or streaming video by the video camera (block 122). The user retrieves an item from at least one of the bins (block 124) and returns to the door (block 126). Upon pushing the exit button to unlock the door, the scale software collects the weights from each of the scales and determines the number of items remaining in each bin (block 128). Items from bins showing a decrease in stock are associated with the individual granted access by the security software (block 130).

Figure 12:
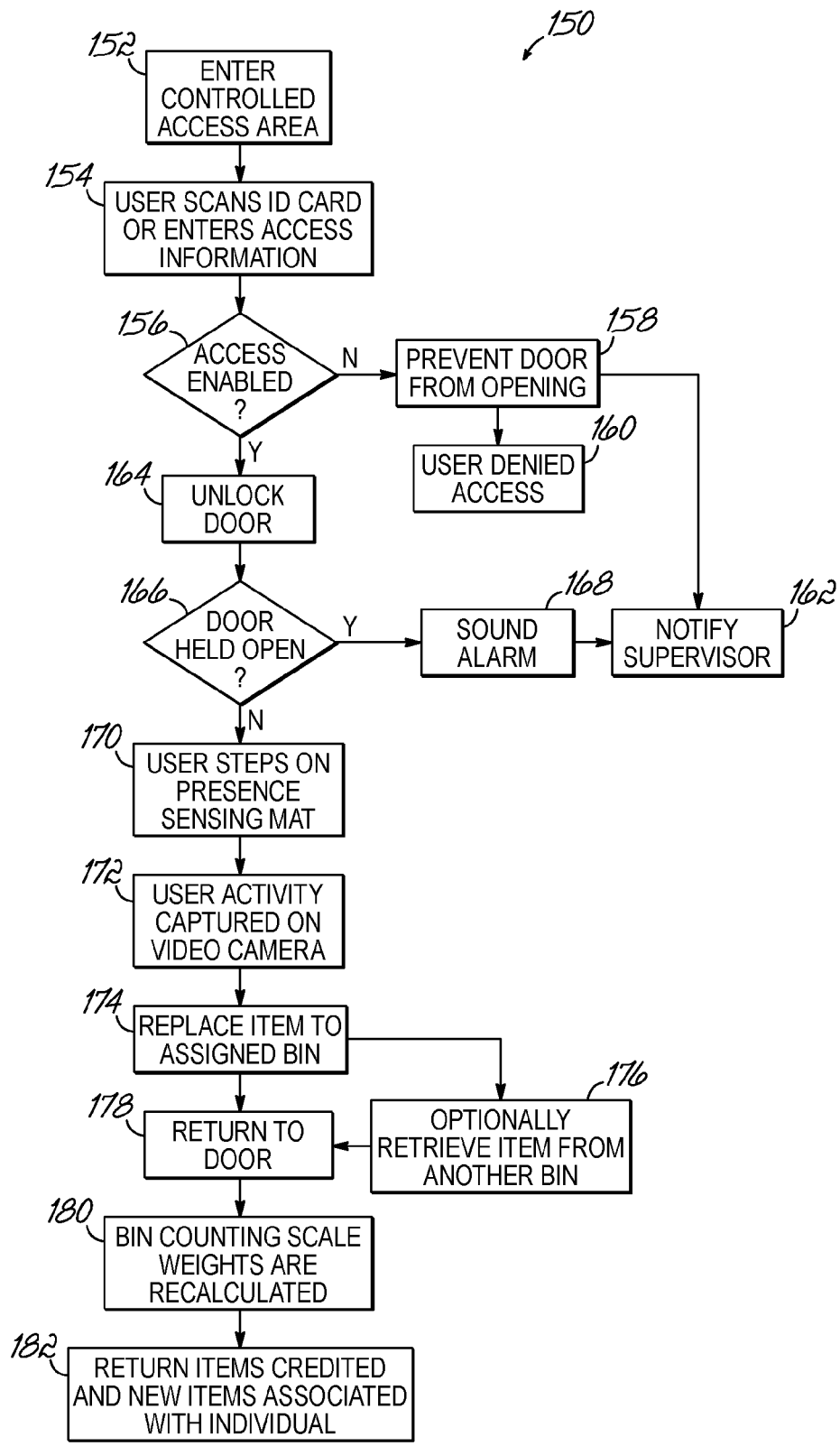
FIG. 12 is a flow chart illustrating the sequence of steps when returning an item to the dispensing unit.

Some items in the dispensing unit may be disposable, one time use items. Others, however, such as durables, may be able to be reused. Reusable items may be returned to the dispensing unit after use and after the return, the items are credited to the user, indicating a return. For example, flowchart 150 in FIG. 12 illustrates steps for the return process. A user, such as an employee or contractor with an item to return, enters the controlled access area of the dispensing unit (block 152). The user scans an ID card or FOB, or alternatively enters access identification information on the touch screen (block 154). The security software may then determine from the identification information if access should be granted to the user. If access is not granted ("No" branch of decision block 156), then the door is prevented from being opened (block 158) denying access to the user (block 160). In some embodiments, a supervisor or other administrator is notified of the denied access (block 162).

If the security software determines that the user is authorized and access is granted ("Yes" branch of decision block 156), the magnetic lock in some embodiments may be disengaged unlocking the door (block 164). In embodiments that do not utilize magnetic locks, other appropriate signals may be sent to the locking mechanism to unlock the door and allow access. If the door is held open longer than a predetermined period of time ("Yes" branch of decision block 166), then an alarm is sounded (block 168) and a supervisor or other administrator may be notified (block 162). The alarm and notification again may assist in discouraging an individual from circumventing the access control and tracking of items within the dispensing unit.

Under normal operation ("No" branch of decision block 166), the user steps on to the presence sensing mat (block 170), and the door closes behind them. The presence sensing mats detect the presence of the user in the distribution unit and the user's activity may be captured as snap shot images or streaming video by the video camera (block 172). The user replaces the item in its assigned bin (block 174). Optionally, the user may also retrieve an item from another bin (block 176). The user returns to the door (block 178). Upon pushing the exit button to unlock the door, the scale software collects the weights from each of the scales and determines the number of items remaining in each bin (block 180). Items from bins showing an increase in stock are credited to the individual granted access by the security software and items from bins showing a decrease in stock are associated with the individual granted access by the security software (block 182).

While the present invention has been illustrated by a description of one or more embodiments thereof and while these embodiments have been described in considerable detail, they are not intended to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the scope of the general inventive concept.

What is claimed is:

1. A portable dispensing device comprising:
   a container configured to be moved to a plurality of locations, the container including an interior and an end;
   an access point positioned at the end of the container and configured to control access by an authorized individual into and out of the container;
   a plurality of bins and a plurality of scales disposed within the interior of the container, where each bin is independently coupled to one of the plurality of scales for measuring a weight of the bin and its contents; and
   a computing device in electrical communication with the access point and configured to allow or deny access to the container, the computing device being in electrical communication with each scale and configured to receive the measured weight from each scale and determine a number of items in each bin based on the measured weight, the computing device being configured to associate an item added to or removed from each bin with the authorized individual upon that individual exiting the container.

2. The portable dispensing device of claim 1, wherein the container is selected from a group consisting of an eight foot standard container box, a ten foot standard container box, a 20 foot standard container box, a standard 40 foot container box, a 53 foot container, and combinations thereof.

3. The portable dispensing device of claim 1, further comprising: an HVAC system, the HVAC system operable to control an environment in the interior of the container.

4. The portable dispensing device of claim 1, further comprising:
   an electromagnetic lock operably coupled to a door of the access point, wherein, the computing device is configured to control the electromagnetic lock in response to an input from the individual.

5. The portable dispensing device of claim 4, further comprising: an emergency door release, wherein the emergency door release is configured to release the electromagnetic lock allowing access to the interior of the container and triggering an alarm.

6. The portable dispensing device of claim 1, further comprising: an antenna positioned on an outer surface of the container, and configured to provide wireless interne access to the computing device.

7. The portable dispensing device of claim 1, further comprising: a camera system including at least one camera device configured to take a visual image of the authorized individual upon entering or exiting the access point, the at least one camera device mounted within the interior of the container.

8. The portable dispensing device of claim 1, further comprising: a shelving unit where each scale is coupled thereto to prevent removal of the scale from the interior of the container.

9. The portable dispensing device of claim 1, further comprising:
   a second container disposed proximate the first container, the second container including a plurality of bins and scales disposed therein, where each bin is independently coupled to one of the plurality of scales for measuring a weight of the bin and its contents; and
   a defined passageway coupling the first container and second container to one another to allow direct access between the interiors of the first container and second container.

10. The portable dispensing device of claim 9, wherein the computing device is in electrical communication with each scale disposed in the first and second containers and is configured to receive the measured weight from each scale and determine a number of items in each bin disposed in the first and second containers based on the measured weight, the computing device being configured to associate an item added or removed from each bin with the authorized individual upon that individual exiting the first container.

11. The portable dispensing device of claim 1, further comprising a sensor disposed along a floor of the container and positioned adjacent to the access point, the sensor being in electrical communication with the computing device for detecting a presence of an authorized individual inside the container.

12. A method of monitoring inventory stored in a portable container, the container having a defined interior and including a lockable access point disposed at one end thereof, a shelving unit disposed in the container for supporting at least two or more bins and scales, where each bin is independently coupled to its respective scale for measuring a weight of the bin and inventory contained in the bin, and a computing device in electrical communication with the access point and with each scale, the method comprising:
   receiving user access information at the access point;
   allowing access to the interior of the container to an authorized user;
   detecting when the authorized user exits the interior of the container through the access point;
   after the detecting step, measuring the weight of each of the at least two or more bins with its respective independently coupled scale disposed in the container; and
   determining if a quantity of inventory in each of the two or more bins changed based on the weight measurements.

13. The method of claim 12, further comprising sensing the presence of the authorized user in the container.

14. The method of claim 13, further comprising enabling a locking mechanism to prohibit access to the interior of the container after the sensing step.

15. The method of claim 12, further comprising triggering the measuring step once the authorized user has exited the container and a door at the access point is securely closed.

16. The method of claim 12, further comprising:
    determining if the user access information satisfies criteria for an authorized user; and
    unlocking the access point if the user access information satisfies the criteria.

17. The method of claim 12, further comprising preventing access to the interior of the container to more than one authorized user.

18. The method of claim 12, wherein the determining step comprises:
    determining if an item of inventory was added to or removed from each of the two or more bins; and
    if it is determined an item was added to one of the two or more bins, determining based on the weight measurement of that bin if the item was added to the correct bin.

19. The method of claim 18, further comprising associating an item added to or removed from a bin to the authorized user.

20. The method of claim 12, further comprising identifying the authorized user from the user access information and at least one image-capturing device.

\* \* \* \* \*